United States Patent
Park

(10) Patent No.: US 11,195,505 B2
(45) Date of Patent: Dec. 7, 2021

(54) LIGHTWEIGHT NOISE ABSORBING MATERIAL AND SUBSTRATE HAVING THE SAME ATTACHED THERETO

(71) Applicant: SEOYON E-HWA CO., LTD., Seoul (KR)

(72) Inventor: Hyun Jun Park, Gyeonggi-do (KR)

(73) Assignee: SEOYON E-HWA CO., LTD, Seoul (KR)

( * ) Notice: Subject to any disclaimer, the term of this patent is extended or adjusted under 35 U.S.C. 154(b) by 41 days.

(21) Appl. No.: 16/446,218

(22) Filed: Jun. 19, 2019

(65) Prior Publication Data
US 2020/0035210 A1    Jan. 30, 2020

(30) Foreign Application Priority Data

Jul. 25, 2018  (KR) .......................... 10-2018-0086483

(51) Int. Cl.
*G10K 11/168* (2006.01)
*B32B 5/02* (2006.01)
(Continued)

(52) U.S. Cl.
CPC .............. *G10K 11/168* (2013.01); *B32B 3/12* (2013.01); *B32B 5/022* (2013.01); *B32B 5/18* (2013.01); *B32B 5/245* (2013.01); *B32B 5/26* (2013.01); *B32B 27/12* (2013.01); *B32B 27/32* (2013.01); *B32B 27/36* (2013.01); *B32B 2262/0253* (2013.01); *B32B 2262/0284* (2013.01); *B32B 2307/102* (2013.01); *B32B 2307/718* (2013.01);
(Continued)

(58) Field of Classification Search
CPC .... G10K 11/168; G10K 11/16; G10K 11/162; B32B 3/12; B32B 5/022; B32B 5/18; B32B 5/245; B32B 5/26; B32B 27/12; B32B 27/32; B32B 27/36; B32B 2262/0253; B32B 2262/0284; B32B 2307/102; B32B 2307/718; B32B 2307/7242; B32B 2307/732; B32B 2605/00; Y10T 442/614
USPC .................................. 181/290, 294; 442/340
See application file for complete search history.

(56) References Cited

U.S. PATENT DOCUMENTS

2010/0307867 A1*   12/2010   Ogawa .................... B32B 15/20
                                                     181/288

FOREIGN PATENT DOCUMENTS

CN        101801725 A      8/2010
JP        2001279567 A    10/2001
(Continued)

OTHER PUBLICATIONS

Translation of JP2005266445. (Year: 2005).*

(Continued)

*Primary Examiner* — Catherine A. Simone
(74) *Attorney, Agent, or Firm* — Tarolli, Sundheim, Covell & Tummino LLP

(57) ABSTRACT

The present disclosure relates to a lightweight noise absorbing material and a substrate having the same attached thereto, and more particularly, to a lightweight noise absorbing material providing lightweight and excellent noise absorption performance compared to existing noise absorbing materials by including a triple thin fiber layer in which upper and lower fine fiber layers are stacked respectively on upper and lower surfaces of a fibrous non-woven fabric, and a substrate having the lightweight noise absorbing material attached thereto.

1 Claim, 3 Drawing Sheets

(51) Int. Cl.
    *B32B 5/26*         (2006.01)
    *B32B 5/18*         (2006.01)
    *B32B 5/24*         (2006.01)
    *B32B 3/12*         (2006.01)
    *B32B 27/12*       (2006.01)
    *B32B 27/32*       (2006.01)
    *B32B 27/36*       (2006.01)

(52) U.S. Cl.
    CPC . *B32B 2307/7242* (2013.01); *B32B 2307/732* (2013.01); *B32B 2605/00* (2013.01); *Y10T 442/614* (2015.04)

(56) References Cited

FOREIGN PATENT DOCUMENTS

| | | | |
|---|---|---|---|
| JP | 2005266445 | A | 9/2005 |
| JP | 2006292946 | A | 10/2006 |
| JP | 2010095236 | A | 4/2010 |
| KR | 1020010066081 | A | 7/2001 |
| KR | 1020070118731 | A | 12/2017 |

OTHER PUBLICATIONS

Korean Office Action for Application No. 10-2018-0086483 dated Aug. 21, 2019.
Korean Office Action for Application No. 10-2018-0086483 dated Feb. 19, 2020.
Chinese Office Action for Application No. 201910651348X dated Mar. 15, 2021.

\* cited by examiner

[FIG. 1]
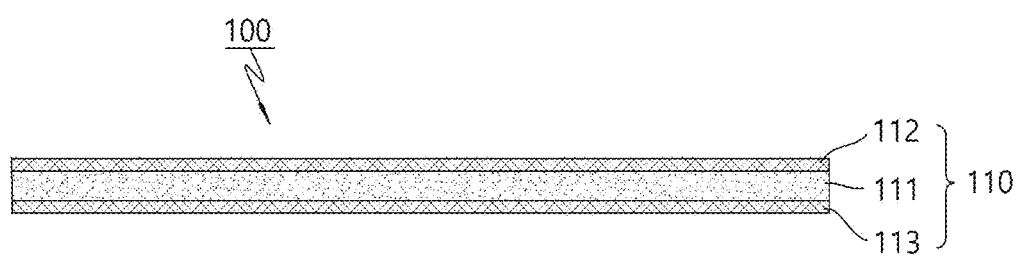
[FIG. 2]
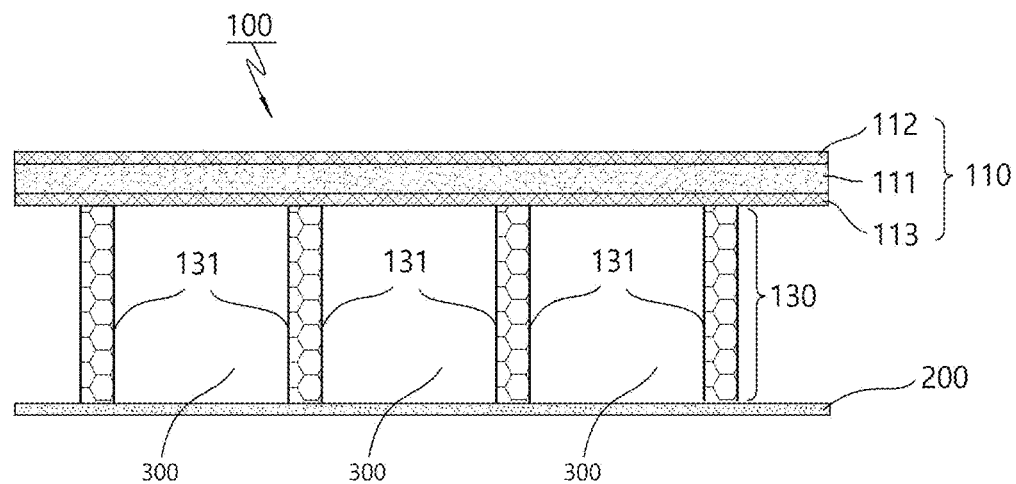

[FIG. 3]
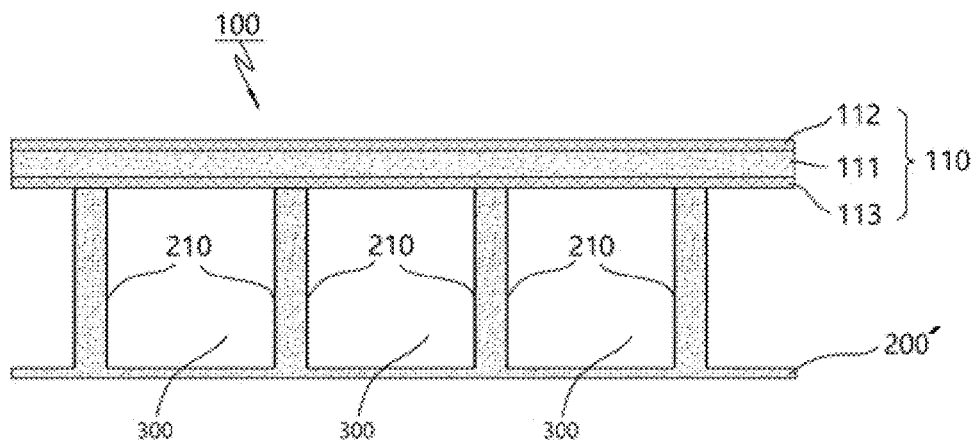
[FIG. 4]
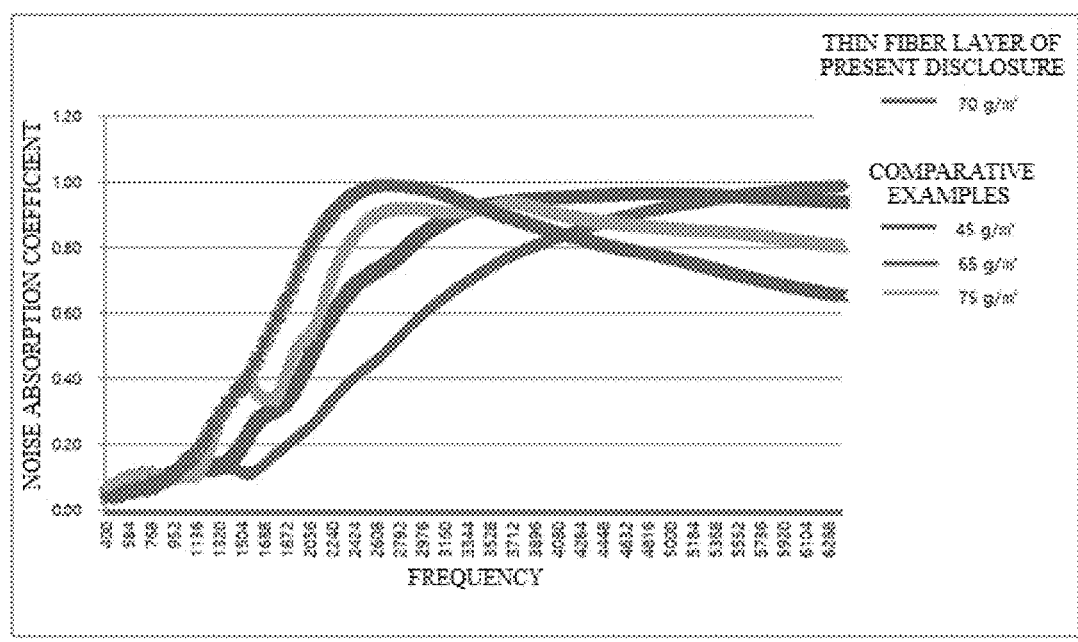

[FIG. 5]
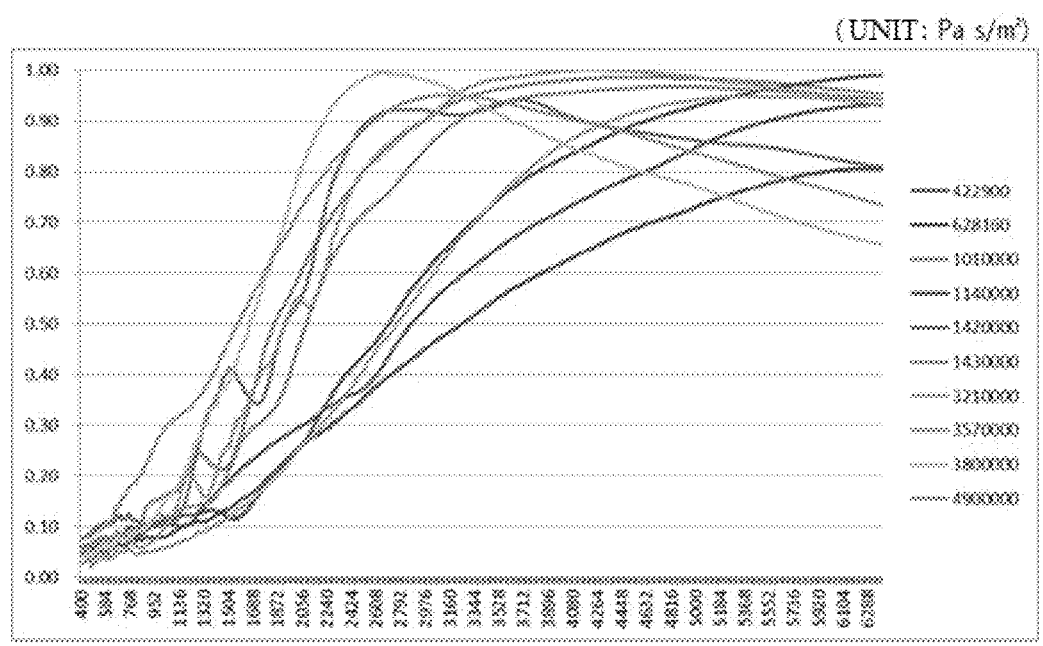

LIGHTWEIGHT NOISE ABSORBING MATERIAL AND SUBSTRATE HAVING THE SAME ATTACHED THERETO

CROSS-REFERENCE TO RELATED APPLICATION

This application claims priority to Korean Patent Application No. 10-2018-0086483, filed on Jul. 25, 2018, the disclosure of which is incorporated herein by reference in its entirety.

BACKGROUND OF THE DISCLOSURE

Field of the Disclosure

Exemplary embodiments in the present disclosure relate to a lightweight noise absorbing material and a substrate having the same attached thereto, and more particularly, to a lightweight noise absorbing material providing lightweight and excellent noise absorption performance compared to existing noise absorbing materials by including a triple thin fiber layer in which fine fiber layers are stacked respectively on upper and lower surfaces of a fibrous non-woven fabric, and a substrate having the lightweight noise absorbing material attached thereto.

Description of the Related Art

Noise absorbing materials are commonly used in vehicles, studios, theaters and the like. Especially in the vehicle, the noise absorbing material is installed on a dash panel which separates an engine room and a vehicle room from each other in order to block noise occurring in the engine room, or installed on a floor panel in order to block noise transferred from a floor of the vehicle.

This noise absorbing material is configured to absorb noise in a process in which sound wave energy is converted into heat energy by motion. When a sound wave is incident into a fiber layer, the fiber layer used as the noise absorbing material may convert sound wave energy into heat energy by a vibration damping phenomenon which is caused by viscous air resistivity and a viscoelastic characteristic of fibers included in the fiber layer, and thus the noise may be finally reduced. Therefore, performance of a fiber-based noise absorbing material may depend on a thickness of the fibers included in the fiber layer, area density and thickness of the fiber layer, and the like. When the fiber has a thinner thickness, more fibers may be put in, and as a result, a porosity of the fiber layer may be increased to improve noise absorption performance. Also, when the fiber layer has increased area density and thickness, the porosity and dispersion path of the sound wave may be increased and thus, the noise absorption performance may be improved. Therefore, the noise absorbing material of high weight and thickness is used for a vehicle. In this case, the noise absorption performance may be improved, but fuel efficiency may be lowered due to an increased weight of the vehicle.

RELATED ART DOCUMENT

Patent Document (Patent Document 1) Korean Patent Laid-Open Publication No. 10-2007-0118731 (Published on Dec. 18, 2017)

(Patent Document 2) Korean Patent Laid-Open Publication No. 10-2001-0066081 (Published on Jul. 11, 2001)

SUMMARY OF THE DISCLOSURE

An object of the present disclosure is to provide a lightweight noise absorbing material and a substrate having the same attached thereto, and more particularly, to a lightweight noise absorbing material providing lightweight and excellent noise absorption performance compared to existing noise absorbing materials by including a triple thin fiber layer in which upper and lower fine fiber layers are stacked respectively on upper and lower surfaces of a fibrous non-woven fabric, and a substrate having the lightweight noise absorbing material attached thereto.

Another object of the present disclosure is to provide a lightweight noise absorbing material in which noise absorption performance may be further improved by further stacking a block layer to have air gaps formed with a predetermined interval between the noise absorbing material and a substrate having the noise absorbing material attached thereto.

Still another object of the present disclosure is to provide a substrate having the lightweight noise absorbing material attached thereto. The substrate may include a plurality of support protrusions protruding outwardly from the substrate to form an air gap between the support protrusions when the lightweight noise absorbing material is attached to the substrate.

Other objects and advantages of the present disclosure may be understood by the following description, and become apparent with reference to the embodiments in the present disclosure. Also, it is obvious to those skilled in the art to which the present disclosure pertains that the objects and advantages of the present disclosure may be realized by the means as claimed and combinations thereof.

In accordance with an aspect of the present disclosure, a lightweight noise absorbing material may include: a triple thin fiber layer including a fibrous non-woven fabric formed of fibers having an average diameter of 10 to 20 μm; and upper and lower fine fiber layers formed of fibers having an average diameter of 2 to 6 μm and stacked respectively on upper and lower surfaces of a fibrous non-woven fabric.

The thin fiber layer may have a weight per unit area of 30 to 100 g/m$^2$, a thickness of 0.2 to 1 mm and air resistivity of 1,000,000 to 5,000,000 Pa·s/m$^2$.

In accordance with another aspect of the present disclosure, the lightweight noise absorbing material may further include a block layer stacked beneath the lower fine fiber layer formed on the lower surface of the fibrous non-woven fabric, and having a plurality of blocks arranged with a predetermined interval therebetween to form air gaps between the blocks when the block layer is attached to the substrate.

The block may be formed of a felt or foam material.

In accordance with still another aspect of the present disclosure, a substrate having the lightweight noise absorbing material attached thereto may further include a plurality of support protrusions protruding outwardly from the substrate to form air gaps between the support protrusions when the lightweight noise absorbing material is attached to the substrate.

BRIEF DESCRIPTION OF THE DRAWINGS

The above and other objects, features and other advantages of the present disclosure may be more clearly understood from the following detailed description taken in conjunction with the accompanying drawings, in which:

FIG. 1 is a schematic cross-sectional view showing a lightweight noise absorbing material including a triple thin fiber layer according to an embodiment in the present disclosure;

FIG. 2 is a schematic cross-sectional view showing the lightweight noise absorbing material further including a block layer stacked beneath the thin fiber layer of FIG. 1;

FIG. 3 is a schematic cross-sectional view showing a state in which the lightweight noise absorbing material of FIG. 1 is attached to a substrate;

FIG. 4 shows graphs comparing noise absorption performance of the lightweight noise absorbing material of FIG. 1 and those of existing noise absorbing materials;

FIG. 5 shows graphs illustrating noise absorption performances of the lightweight noise absorbing material of FIG. 1 depending on air resistivity; and

DESCRIPTION OF SPECIFIC EMBODIMENTS

According to an embodiment in the present disclosure, a lightweight noise absorbing material and a substrate having the same attached thereto is hereinafter described in detail with reference to the accompanying drawings.

The accompanying drawings in the present disclosure may be exaggerated to clearly distinguish the present disclosure from the prior art and to assist in understanding of the technique disclosed in the present disclosure. Further, the following terminologies are defined in consideration of the functions in the present disclosure and may be construed in different ways by the intention of users and operators. Therefore, the definitions thereof should be construed based on the contents throughout the specification. Meanwhile, exemplary embodiments of the present disclosure are only examples of the components disclosed in the claims and the scope of present disclosure is not limited thereto. The scope of the present disclosure should be interpreted based on the technical idea suggested in the entire specification of the present disclosure.

First Exemplary Embodiment

Hereinafter, a lightweight noise absorbing material including a thin fiber layer in accordance with a first exemplary embodiment in the present disclosure is described with reference to FIG. 1. FIG. 1 is a schematic cross-sectional view showing a triple thin fiber layer 110. The thin fiber layer 110 includes a fibrous non-woven fabric 111 and the upper and lower fine fiber layers 112 and 113 stacked respectively on upper and lower surfaces of the fibrous non-woven fabric.

The fibrous non-woven fabric 111 is formed of fibers having an average diameter of 10 to 20 μm, and the upper and lower fine fiber layers 112 and 113 are formed of fibers having an average diameter of 2 to 6 μm and stacked respectively on the upper and lower surfaces of the fibrous non-woven fabric 111.

The fibers included in the fibrous non-woven fabric 111 and the upper and lower fine fiber layers 112 and 113 may be formed of any polymer which may be used as a common noise absorbing material, and may generally be at least one selected from the group consisting of polyethylene, polypropylene, polyamide, polyamide copolymer, polyurethane, polyester, polyester copolymer, polyvinyl acetate and polyvinyl alcohol.

The fibrous non-woven fabric 111 serves to increase physical property (tensile strength) and air resistivity of the thin fiber layer 110. When the fibers included in the fibrous non-woven fabric 111 have the average diameter of 10 to 20 μm, the air resistivity may be increased to a certain level or higher.

The upper and lower fine fiber layers 112 and 113 serve to increase the air resistivity and simultaneously, to convert sound wave energy into heat or vibration energy. The fibers included in the upper and lower fine fiber layers 112 and 113 may be formed to have the average diameter of 2 to 6 μm. The reason is that in the above range, the air resistivity may be increased by weight to increase noise absorption performance.

The thin fiber layer 110 may be formed to have a weight per unit area of 30 to 100 g/m$^2$ and a thickness of 0.2 to 1 mm. The reason is that in the above range, the thin fiber layer 110 may have excellent noise absorption performance with respect to a price thereof.

In addition, the thin fiber layer 110 may be formed to have air resistivity of 1,000,000 to 5,000,000 Pa·s/m$^2$. The reason is that in the above range, the thin fiber layer 110 may have better noise absorption performance as seen from FIG. 5.

The thin fiber layer 110 according to the first exemplary embodiment in the present disclosure has higher air resistivity than that of a single-layered fiber layer as seen from a result of a comparison experiment in FIG. 4. For reference, FIG. 4 shows graphs which illustrate an experiment comparing noise absorption performance of the thin fiber layer 110 according to the present disclosure and those of existing single-layered fiber layers. In the present experiment, the thin fiber layer 110 according to the present disclosure is a thin fiber layer formed by stacking the upper and lower fine fiber layers 112 and 113 on the upper and lower surfaces of the fibrous non-woven fabric 111, and having an area density of 70 g/m$^2$, in which the upper and lower fine fiber layers 112 and 113 include fibers having an average diameter of 3 μm and formed of polypropylene (PP), and the fibrous non-woven fabric 111 has an average diameter of 30 μm and is formed of polyethylene terephthalate (PET). As comparative examples, the existing fiber layers are formed only of PP and have an average diameter of 3 μm and respective area densities of 45 g/m$^2$, 65 g/m$^2$ and 75 g/m$^2$. In the present experiment, for measuring the noise absorption performances, the thin fiber layer 110 of the present disclosure and the existing fiber layers are fixed to an impedance tube to have an air gap thickness of 10 mm, and then the noise absorption performances thereof are measured using an in-tube method.

As a result, even though a noise absorbing material having a higher area density generally has a more improved noise absorption performance, a lightweight noise absorbing material 100 [having the area density of 70 g/m$^2$] according to the present disclosure is confirmed to have excellent noise absorption performance as compared to those of existing noise absorbing materials [having the area density of 75 g/m$^2$] in a low frequency band of 3,000 Hz or less. In particular, the low frequency band belongs to a noise frequency region generated when a vehicle is traveling, and thus further excellent noise absorption effect may be achieved when the thin fiber layer 110 is used in an interior of the vehicle.

Second Exemplary Embodiment

Hereinafter, a lightweight noise absorbing material 100 in accordance with a second exemplary embodiment in the present disclosure is described with reference to FIG. 2. FIG. 2 shows that a block layer 130 is stacked beneath the thin fiber layer 110 of the first embodiment described above. The block layer 130 is stacked beneath a lower fine fiber layer 113 of the thin fiber layer 110 and has a plurality of blocks 131 arranged with an equal or unequal interval therebetween. When the lightweight noise absorbing material 100 is attached to a substrate 200, air gaps 300 are formed between the blocks 131 included in the block layer 130. As a result, as compared to an existing noise absorbing material having a single-layer and the same thickness, the lightweight noise absorbing material 100 may have a further reduced area density, and accordingly, may have advantages of light weight, reduced cost, and excellent noise absorption performance. The block 131 may be formed of a felt or polymer foam material.

Third Exemplary Embodiment

Hereinafter, a lightweight noise absorbing material 100 in accordance with a third exemplary embodiment in the present disclosure is described with reference to FIG. 3. As described above, FIG. 3 shows a separately designed substrate 200' formed to have air gaps when the lightweight noise absorbing material 100 of the present disclosure is attached to the substrate 200' as described above. FIG. 3 shows a state in which the lightweight noise absorbing material 100 including the thin fiber layer 110 of the first embodiment is attached to the substrate 200'. The substrate 200' includes a plurality of support protrusions 210 protruding outwardly from the substrate. The lightweight noise absorbing material 100 is attached to the substrate 200' and thereafter, air gaps 300 are formed between the support protrusions 210. The support protrusions 210 may have a height of 4 to 20 mm and may be formed in a process of injecting the substrate 200' or integrated with a flat substrate through a separate bonding process.

As described above, the lightweight noise absorbing material and the substrate having the same attached thereto according to the present disclosure may have the following effects:

1. The triple thin fiber layer according to the present disclosure may have higher air resistivity than that of the single-layered noise absorbing material having the same area density and accordingly, may provide the excellent noise absorption performance.

2. When the block layer having the plurality of blocks arranged with a predetermined interval therebetween is further stacked beneath the thin fiber layer, the dispersion path of the sound wave may be increased even though the area density of the noise absorbing material is not significantly increased and thus, the noise absorption performance may be further improved.

3. The substrate may include the plurality of support protrusions protruding outwardly from the substrate to have the air gaps formed by the support protrusions between the substrate and the lightweight noise absorbing material. Therefore, when the lightweight noise absorbing material of the present disclosure is attached to the substrate, the dispersion path of the sound wave may be increased and thus, the noise absorption performance may be further improved.

The exemplary embodiments in the present disclosure described above and illustrated in the drawings should not be interpreted as limiting the technical idea of the present disclosure. The scope of the present disclosure is limited only by the accompanying claims, and those skilled in the art may modify and change the technical idea of the present disclosure in various forms. Therefore, it is obvious to those skilled in the art that these alterations and modifications fall within the scope of the present disclosure.

What is claimed is:

1. A lightweight noise absorbing material for low frequency noise absorption in the range of 2,000 to 3,000 Hz comprising:
   a triple thin fiber layer including a fibrous non-woven fabric formed of fibers having an average diameter of 10 to 20 µm;
   upper and lower fine fiber layers formed of fibers having an average diameter of 2 to 6 µm and stacked respectively on upper and lower surfaces of the fibrous non-woven fabric; and
   a block layer stacked beneath the lower fine fiber layer and having a plurality of blocks arranged with a predetermined interval there between to form air gaps between the blocks,
   wherein the block layer is formed of a felt or foam material, and
   wherein the triple thin fiber layer has a weight per unit area of 30 to 75 $g/m^2$, a thickness of 0.2 to 1 mm, and air resistivity of 1,000,000 to 5,000,000 $Pa \cdot s/m^2$.

* * * * *